US007779632B2

(12) United States Patent
Niiyama et al.

(10) Patent No.: US 7,779,632 B2
(45) Date of Patent: Aug. 24, 2010

(54) EXTERNAL COMBUSTION ENGINE

(75) Inventors: Yasunori Niiyama, Kuwana (JP); Shinichi Yatsuzuka, Nagoya (JP); Takashi Kaneko, Nagoya (JP); Shuzo Oda, Kariya (JP); Katsuya Komaki, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 12/074,595

(22) Filed: Mar. 5, 2008

(65) Prior Publication Data

US 2008/0223033 A1 Sep. 18, 2008

(30) Foreign Application Priority Data

Mar. 12, 2007 (JP) ............................ 2007-062018

(51) Int. Cl.
*F02G 1/04* (2006.01)
*F01K 23/06* (2006.01)
*F02C 5/00* (2006.01)

(52) U.S. Cl. ............................ 60/531; 60/508; 60/516; 60/370; 60/39.6

(58) Field of Classification Search ........... 60/517–526; 137/12, 14, 468
See application file for complete search history.

(56) References Cited

U.S. PATENT DOCUMENTS 6,640,886 B2 * 11/2003 Lamich ...................... 165/174
6,666,031 B2 12/2003 Ohkubo et al.
6,931,852 B2 8/2005 Yatsuzuka et al.
6,976,360 B1 * 12/2005 Yatsuzuka et al. ............ 60/645
2004/0031480 A1 2/2004 Jung et al.
2005/0193737 A1 * 9/2005 Oda et al. ...................... 60/670
2005/0257524 A1 11/2005 Yatsuzuka et al.
2005/0257525 A1 11/2005 Komaki et al.

(Continued)

FOREIGN PATENT DOCUMENTS

JP 58-057014 4/1983

(Continued)

OTHER PUBLICATIONS

U.S. Appl. No. 11/973,364, filed Oct. 5, 2007, Niiyama et al.

*Primary Examiner*—Thomas E Denion
*Assistant Examiner*—Christopher Jetton
(74) *Attorney, Agent, or Firm*—Harness, Dickey & Pierce, PLC

(57) ABSTRACT

An external combustion engine 10 is disclosed, wherein a container 11 sealed with a working medium adapted to flow in a liquid state includes a heating unit 13 for generating a vapor of the working medium 12 by heating part of the working medium, and a cooling unit 14 for liquefying by cooling the vapor. The volume of the working medium 12 is changed by the generation and liquefaction of the vapor, and the displacement of the liquid portion of the working medium 12 caused by the volume change of the working medium 12 is converted into and output as mechanical energy. The heating unit 13 is structured so that inner members 51*a*, 53*a* arranged on the inside and outer members 51*b*, 53*b* arranged on the outside are bonded to each other. The outer members 51*b*, 53*b* are made of a second material higher in heat resistance than the first material of the inner members 51*a*, 53*a*. Further, the thickness of the inner members 51*a*, 53*a* is not smaller than the thermal penetration depth δ of the first material.

12 Claims, 10 Drawing Sheets

U.S. PATENT DOCUMENTS

2007/0214784 A1 9/2007 Oda et al.

FOREIGN PATENT DOCUMENTS

| | | |
|---|---|---|
| JP | 08-005282 | 1/1996 |
| JP | 2002-022378 | 1/2002 |
| JP | 2003-343926 | 12/2003 |
| JP | 2004-003817 | 1/2004 |
| JP | 2004-053167 | 2/2004 |
| JP | 2004-084523 | 3/2004 |
| JP | 2005-330883 | 12/2005 |
| JP | 2005-330885 | 12/2005 |
| JP | 2005-330910 | 12/2005 |

* cited by examiner

EXTERNAL COMBUSTION ENGINE

FIELD OF THE INVENTION

This invention relates to an external combustion engine.

DESCRIPTION OF THE RELATED ART

One type of conventional external combustion engine comprises a sealed container with a liquid working medium. The container has a heating unit for heating part of the working medium to vaporize the working medium, and a cooling unit for cooling and liquefying the vapor. The volume of the working medium changes as it is vaporized of liquified and the displacement of the liquid portion of the working medium caused by the volume change of the working medium is retrieved as mechanical energy (See, for example, Japanese Unexamined Patent Publication No. 2004-84523).

The heating unit is heated by a heater arranged on the outside thereof, and by exchanging heat with the working medium, heats the working medium in the heating unit. The heating unit is made of a material such as copper or aluminum which is high in heat conductivity (See, for example, Japanese Unexamined Patent Publication No. 2004-84523).

The heating unit described above uses a liquid working medium, and the heat exchange operation thereof is unsteady. A heat exchanger for conducting the steady heat exchange operation, on the other hand, uses a heat pipe (See, for example, Japanese Unexamined Patent Publication No. 2002-22378).

SUMMARY OF THE INVENTION

A material high in heat conductivity is generally low in heat resistance, and therefore, not suitable for use as a material for a heating unit heated at a high temperature.

The exhaust gas of an internal combustion engine may be used as a heat source to heat the heating unit. However, the exhaust gas, reaches a temperature as high as about 600 to 800° C. In the case where the heating unit is made of a material that only has high heat conductivity, the strength of the material is reduced at a high temperature, and fails to satisfy the requirement of a pressure container.

To cope with this problem, the heating temperature can be increased by increasing the thickness of the members making up the heating unit which may be made of a material high in heat conductivity. In this case, the heating unit is undesirably increased in size, and this method cannot be used in a case where the heating unit is heated at a temperature higher than the softening point of the material high in heat conductivity.

As another method for solving this problem, the heating unit may be made of a material high in heat resistance. However, such a material is low in heat conductivity as explained below, and therefore, compared with a material high in heat conductivity, the temperature of the heating unit is decreased more in the boiling process resulting in lower engine efficiency.

FIG. 13 shows the change in the temperature of the heating unit with time in the case where the heating unit is made of a material high in heat conductivity. The temperature of the heating unit in this case is that of the portion of the heating unit in contact with the medium.

In an ordinary heat exchanger, such as the heat pipe described above, as indicated by the one-dot chain line in FIG. 13, heat is exchanged steadily. Therefore, the amount of heat exchange is constant and so is the temperature T1 of the heat transmission portion of the heat exchanger.

With an external combustion engine having the constitution described above as the related art, it is understood, from the relationship between the amount of heat exchange and time indicated by the solid line in FIG. 13, that heat exchange is performed only in during the boiling process, i.e. intermittently. As understood from the relationship between the heating unit temperature and time shown by a solid line in FIG. 13, the heating unit temperature drops from T0 before heat exchange to T2 after heat exchange, followed by gradual increase back to T0. In this way, with an external combustion engine having the constitution as the related art above, unlike an ordinary heat exchanger, vapor is generated by unsteady heat exchange, and therefore, a phenomenon unique to the external combustion engine occurs in which the temperature of the heating unit drops after heat exchange.

FIG. 14 shows the change in heat exchange amount and heating unit temperature with time in the case where the heating unit is made of only a material high in heat conductivity and in the case where the heating unit is made of a material high in heat resistance. Incidentally, the heating unit temperature is the temperature of the portion of the heating unit in contact with the medium. In FIG. 14, the one-dot chain line indicates a case in which the heating unit is made of only a material high in heat conductivity, and the solid line a case in which the heating unit is made of only a material high in heat resistance. Also, FIG. 15 shows the relationship between engine efficiency and the temperature of the portion of the heating unit in contact with the medium.

The study by the present inventor indicates that as shown in FIG. 14, in the case where the heating unit is made of only a material high in heat resistance, the temperature T3 at the portion of the heating unit in contact with the medium after heat exchange is lower than the temperature T2 of the same portion of the heating unit in contact with the medium after heat exchange in the case where the heating unit is made of a material high in heat conductivity.

Also, in view of the fact that the vapor generated after heat exchange comes into contact with the heating unit, the temperature of the vapor is substantially equal to the temperature of the portion of the heating unit in contact with the medium after heat exchange. Thus, a low vapor temperature leads to a low vapor pressure, resulting in a lower output of mechanical energy. As shown in FIG. 15, the lower the temperature of the heating unit, the lower the engine efficiency.

In view of the above described, points a first object of this invention is to provide a structure of the heating unit which is capable of standing a higher temperature at which the heating unit is heated than in the prior art. A second object of the invention is to improve engine efficiency in addition to the first object. A third object of the invention is to reduce the size of the heating unit in addition to the second object.

In order to achieve the aforementioned objects, according to a first aspect of the invention, there is provided an external combustion engine, wherein a heating unit (13) is constructed so that inner portions (51*a*, 53*a*) facing a working medium are made of a first material higher in heat transmission performance (β) than outer portions (51*b*, 53*b*) arranged on the outside of inner portions (51*a*, 53*a*), and outer portions (51*b*, 53*b*) are made of a second material higher in the upper limit temperature capable of maintaining the required strength of the container than inner portions (51*a*, 53*a*) at the time of operation of the external combustion engine.

In this aspect of the invention, the outer portions of the heating unit are made of the second material higher than the first material in the upper limit temperature capable of maintaining the strength required of the container while the external combustion engine is in operation. As compared with the case in which the heating unit is made of only the second material with the same thickness of the portions of the heating unit, the structure of the heating unit can withstand a higher temperature to which the heater unit is heated than in the prior art.

According to a second aspect of the invention, there is provided an external combustion engine, wherein heating unit (13) is formed of inner members (51*a*, 53*a*) arranged on the inside facing working medium (12) and outer members (51*b*, 53*b*) arranged on the outside facing a heat source and coupled to inner members (51*a*, 53*a*), wherein inner members (51*a*, 53*a*) are made of a first material higher in heat transmission performance than outer members (51*b*, 53*b*), and wherein outer members (51*b*, 53*b*) are made of a second material higher than the first material in the upper limit temperature capable of maintaining the strength required of container (11) while the external combustion engine is in operation.

According to a third aspect of the invention, there is provided an external combustion engine, wherein inner portion (51*a*, 53*a*) made of the first material whose thickness (t2) in the direction perpendicular to a surface (57) in contact with the working medium is preferably not smaller than the thermal penetration depth (δ) of the first material.

The thickness of the portion made of the first material corresponding to the thermal penetration depth of the particular material can be secured, so that the range of the heating unit deprived of heat by the working medium at the time of instantaneous heat exchange between the material of the heating unit and the working medium can be widened, and therefore the temperature decrease of the heating unit can be minimized for an improved engine efficiency.

According to a fourth aspect of the invention, there is provided an external combustion engine, wherein the thickness (t2) of inner portion (51*a*, 53*a*) of the first material in the direction perpendicular to surface (57) in contact with the working medium is preferably equal to thermal penetration depth (δ1) of the first material.

In this constitution, the temperature drop of the heating unit can be minimized while at the same time reducing the thickness of the inner portions to a minimum, thereby making it possible to reduce the size of the heating unit.

According to a fifth aspect of the invention, there is provided an external combustion engine, wherein inner fins (71) for reinforcing the heating unit may be arranged within an internal portion of heating unit (13) into which the working medium flows.

In this constitution, the strength of the heating unit is increased, and therefore, compared with the case in which no inner fin is arranged, the thickness of the material making up the outside portion of the heating unit can be reduced while at the same time maintaining the strength required of the heating unit as a pressure vessel. Thus, the size of the heating unit can be reduced. The first material is preferably used to construct the inner fins.

According to a sixth aspect of the invention, there is provided an external combustion engine, wherein heat pipes (81) including pipes (2) each forming a closed space and a heat medium (83) sealed in the pipes and capable of changing phase may be arranged at positions in contact with portion (51*a*, 53*a*) made of the first material other than the internal portion of heating unit (13) into which the working medium flows.

In this constitution, the heat transmission performance of the material making up the inner portions of the heating unit can be improved and the temperature drop of the heating unit in the evaporation process can be suppressed.

According to a seventh aspect of the invention, there is provided an external combustion engine, wherein the first material may be an elementary metal such as copper, silver, gold or aluminum or a metal material containing any of the elementary metals, and the second material may be one of austenitic stainless steel, nickel or nickel alloy.

The reference numerals inserted in parentheses following the names of the respective means in the appended claims and this column are examples indicating the correspondence with the specific means described in the embodiments below.

The present invention may be more fully understood from the description of preferred embodiments of the invention, as set forth below, together with the accompanying drawings.

DESCRIPTION OF THE PREFERRED EMBODIMENTS

First Embodiment

Figure 1:
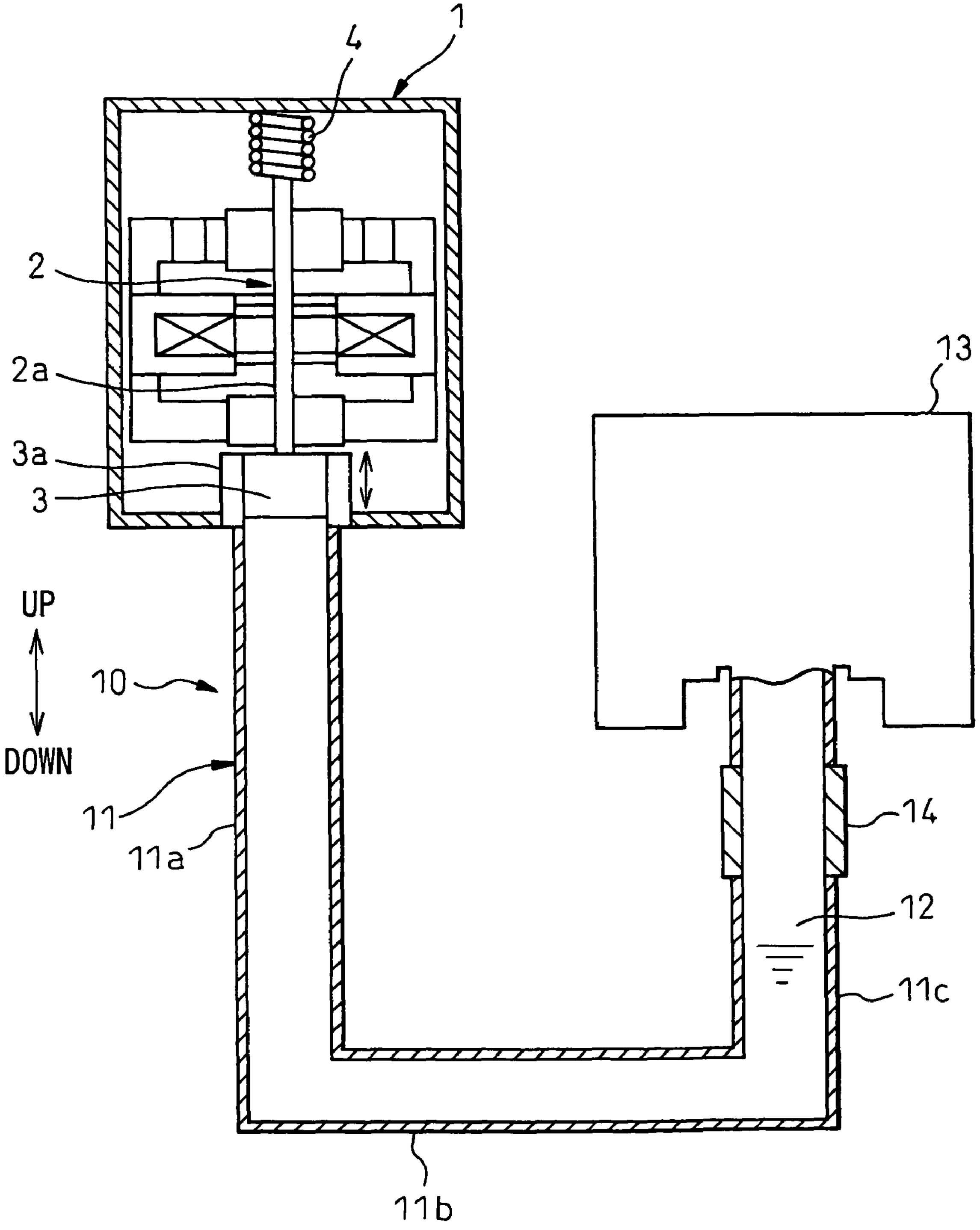
FIG. 1 is a diagram showing a general constitution of a power generating system according to a first embodiment of the invention.

This embodiment represents an application of the external combustion engine according to the invention to a power generating system. FIG. 1 shows a general constitution of a power generating system according to the first embodiment of the invention. In FIG. 1, the vertical arrow indicates the vertical direction of the external combustion engine installed.

First, a general constitution of the power generating system according to this embodiment will be explained briefly. The power generating system according to this embodiment includes a generator 1 and an external combustion engine 10. Generator 1 is adapted to generate the electromotive force by vibratory displacement of a movable member 2 with a permanent magnet embedded therein and driven by external combustion engine 10.

External combustion engine 10 includes a container 11 sealed with a working medium adapted to flow in liquid state. Water is used, for example, as working medium 12. Container 11 is a pressure vessel mainly formed in the shape of a pipe and includes a first tubular portion 11*a* extending downward from power generator 1, a second tubular portion 11*b* extending horizontally from the lower end of first tubular portion 11*a* and a third tubular portion 11*c* extending upward from second tubular portion 11*b*.

Heating unit 13 is arranged at the upper end of third tubular portion 11*c*, and a cooling unit 14 on the portion of third tubular portion 11*c* lower than heating unit 13.

Heating unit 13 makes up a part of container 11 and has the function of generating the vapor of working medium 12 by heating working medium 12 with an external heat source. This heating unit 13 will be explained in detail later.

Cooling unit 14 also makes up a part of container 11 and has the function of cooling and liquefying the vapor of working medium 12 generated in heating unit 13. Cooling unit 14 is a tube made of copper or aluminum high in heat conductivity.

Cooling unit 14 is connected to, for example, a cooling water circuit not shown. As the result of heat exchange with the cooling water in the cooling water circuit, the vapor of working medium 12 is deprived of heat by the cooling water and the heat retrieved from the vapor of working medium 12 by the cooling water is released into the atmosphere by a radiator arranged in the cooling water circuit.

The portion of container 11 other than heating unit 13 and cooling unit 13 is made of a material such as stainless steel high in heat insulation.

At the upper end of first tubular portion 11*a* of container 11, a piston 3 adapted to be displaced by the pressure from the liquid portion of working medium 12 is arranged slidably on a cylinder portion 3*a*. Piston 3 is coupled to a shaft 2*a* of movable member 2, and an elastic means composed of a spring 4 for generating an elastic force to press movable member 2 toward piston 3 is arranged on the opposite side of movable member 2 far from piston 3.

Figure 2:
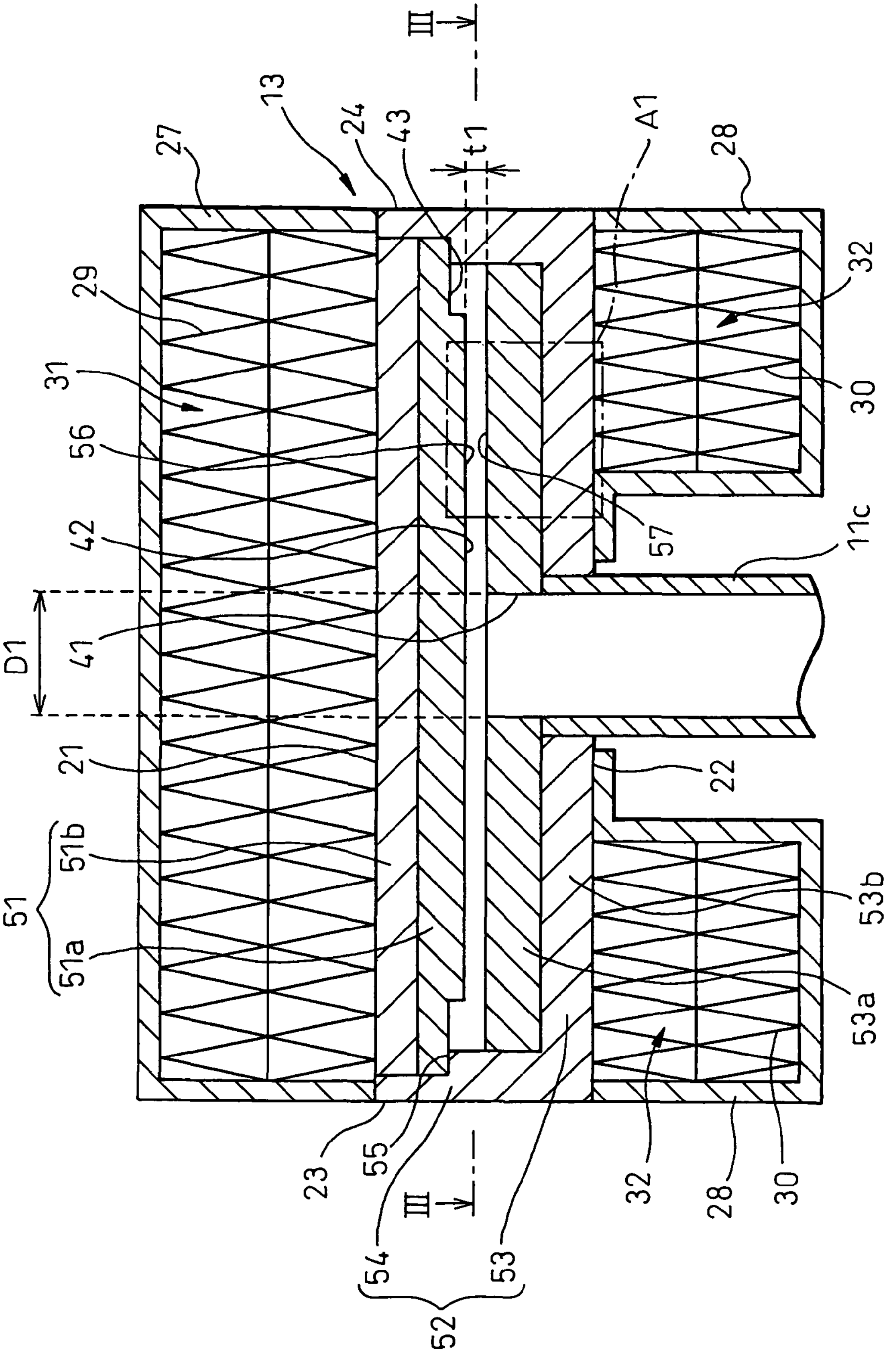
FIG. 2 is a longitudinal sectional view of heating unit 13.

Next, heating unit 13 according to this embodiment will be explained in detail. FIG. 2 is a longitudinal sectional view of heating unit 13 shown in FIG. 1, and FIG. 3 a sectional view taken along line III-III in FIG. 2.

Figure 3:
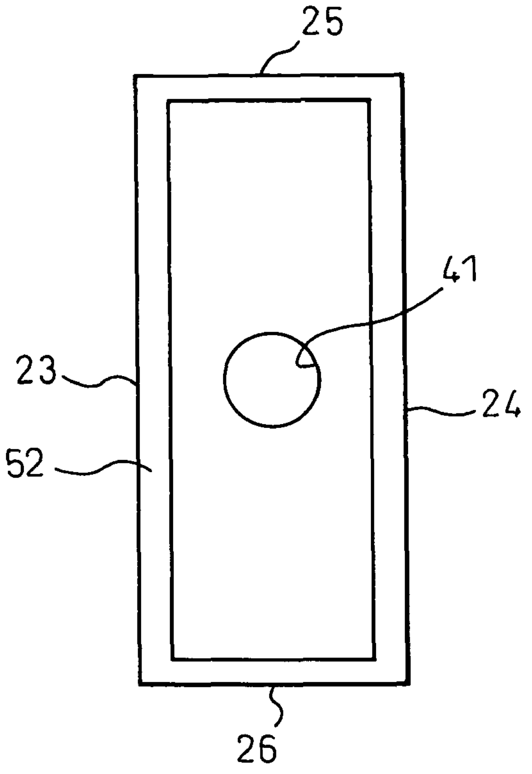
FIG. 3 is a sectional view taken along line III-III in FIG. 2.

As shown in FIGS. 2 and 3, heating unit 13 has a contour in the shape of a thin parallelopiped extending in the direction perpendicular to third tubular portion 11*c* and having an upper surface 21, a lower surface 22 and side surfaces 23 to 26. Upper surface 21 and lower surface 22 are arranged orthogonally to the direction in which third tubular portion 11*c* is extended.

On the outside of heating unit 13, a first cover 27 and second covers 28, which form a path of the exhaust gas emitted from the internal combustion engine, are provided in contact with upper surface 21 and lower surface 22, respectively. According to this embodiment, the exhaust gas emitted from the internal combustion engine is used as a heat source. Also, the internal combustion engine is installed for another purpose than the power generating system.

Specifically, upper surface 21 and first cover 27 define an upper exhaust gas passage 31, so that the heat of the exhaust gas is transmitted into heating unit 13 from upper surface 21. Further, fins 29 to promote the heat transmission are arranged in upper exhaust gas passage 31.

In similar fashion, lower surface 22 and second covers 38 make up lower exhaust gas passages 32, so that the heat of the exhaust gas is transmitted into heating unit 13 from lower surface 22. Further, fins 30 to promote the heat transmission are arranged in lower exhaust gas passages 32. Incidentally, second covers 28 forms lower exhaust gas passages 32 in the area other than the central portion of lower surface 22 avoiding third tubular portion 11*c*.

Heating unit 13 has an internal space as a path of working medium 12. Specifically, as shown in FIG. 2, heating unit 13 includes a first path 41 communicating with third tubular portion 11*c* and a second path 42 communicating with first path 41. First path 41 extends in the same direction as third tubular portion 11*c*, and second path 42 in the direction across third tubular portion 11*c*.

Also, as shown in FIGS. 2 and 3, first path 41 is in the shape of a cylinder coaxial with third tubular portion 11*c*. Second path 42 extends radially outward of first path 41 and has a rectangular cross section with first path 41 at the center thereof. The cross section of second path 42 may be in any other shape than a rectangle, such as a circle extending radially outward of first path 41. The thickness t1 of second path 42 is smaller than the inner diameter D1 of first path 41.

Also, as shown in FIG. 2, heating unit 13 contains therein a vapor pool 43 providing a space for storing the vapor of working medium 12 generated in heating unit 13. Vapor pool 43 communicates with a second communication portion 42 and is arranged at the end of second communication portion 42 far from first path 41. Vapor pool 43 is arranged along the outer periphery of heating unit 13.

Also, heating unit 13 comprises two parts including an upper part 51 and a lower part 52. Upper part 51 is in the shape of a thin parallelopiped making up an upper surface 21 of heating unit 13. Lower part 52 has thin parallelopipedal parts 53 making up a lower surface 22 of heating unit 13 and side walls 54 making up side surfaces 23 to 25 of heating unit 13.

Second path 42 is configured of a space between upper part 51 and lower part 52. Upper part 51 is supported by a step 55 formed on each inner side wall of lower part 52.

Further, upper part 51 and parallelopipedal portions 53 of lower part 52 have a structure in which inner members 51*a*, 53*a* located on the inside of heating unit 13 and outer members 51*b*, 53*b* located on the outside of heating unit 13 are coupled directly to each other.

Inner members 51*a*, 53*a* have surfaces 56, 57, respectively, which define second path 42 and face working medium 12. Outer members 51*b*, 53*b* make up upper surface 21 and lower surface 22, respectively, of heating unit 13 and face exhaust gas passages 31, 32 as a heat source.

Inner members 51*a*, 53*a* and outer members 51*b*, 53*b* are made of different materials. Inner members 51*a*, 53*a* are made of a first material higher in heat transmission performance $\beta$ than the material of outer members 51*b*, 53*b*. Outer members 51*b*, 53*b* are made of a second material higher than the first material in the upper limit temperature at which the strength required of container 11 can be maintained while the external combustion engine is in operation. The heat transmission performance $\beta$ herein is expressed by Equation (1) below using the heat conductivity $\lambda$, density $\rho$ and the specific heat Cp of the particular material.

$$\beta=\sqrt{(\lambda\cdot\rho\cdot Cp)} \quad (1)$$

The first material is high in heat transmission performance and made of an elementary metal such as copper, silver, gold or aluminum or an alloy containing any of these elementary metals as a main component. In view of the fact that the exhaust gas is used as a heat source according to this embodiment, however, the second material has a high strength at a high temperature of about 600 to 800° C., i.e. a high heat resistance and, for example, austenitic stainless steel, nickel or nickel alloy. In a specific combination, copper can be employed as the first material and stainless steel as the second material.

The upper limit temperature at which the strength required of container 11 can be maintained during the engine operation is defined as a temperature to which heating unit 13 is heated and at which the strength of the members making up heating unit 13 begins to decrease below the strength required as a pressure vessel.

Figure 4:
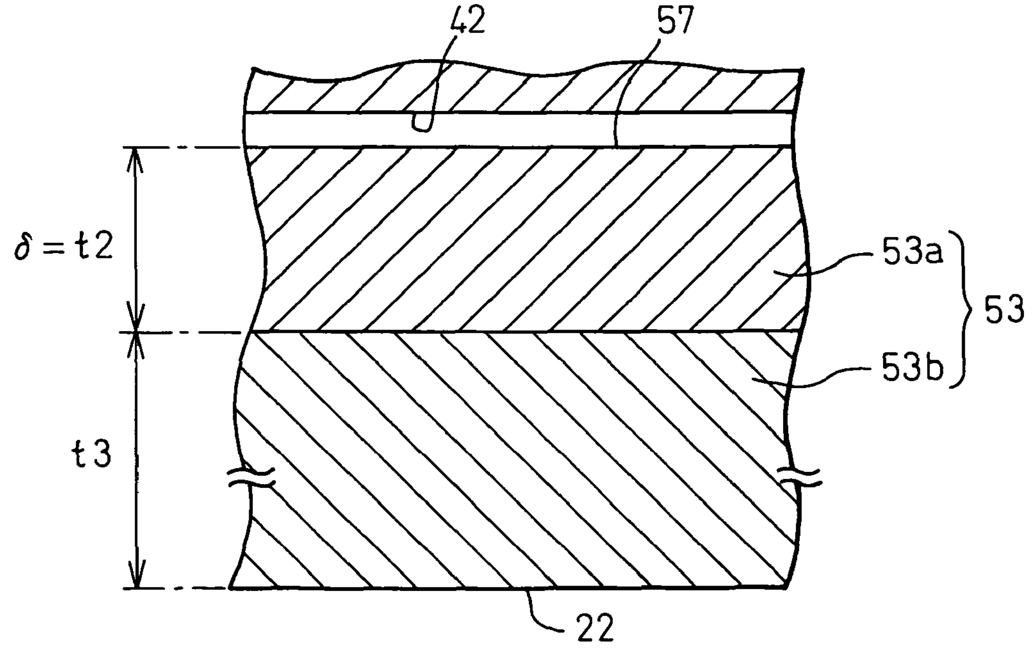
FIG. 4 is an enlarged view of an area A1 defined by one-dot chain line in FIG. 2.

FIG. 4 is an enlarged view of area A1 defined by the one-dot chain line in FIG. 2. As shown in FIG. 4, the thickness t2 of inner member 53*a* of parallelopipedal portion 53 of lower part 52 is equal to thermal penetration depth δ of inner member 53*a*, and the thickness t3 of outer member 53*b* satisfies the strength required to form a pressure vessel.

The thickness of inner member 53*a* is defined as the thickness along the direction perpendicular to a surface 57 forming second path 42, i.e. surface 57 in contact with working medium 12.

Also, thermal penetration depth δ is defined as the depth by which heat penetrates from the surface of a material for a predetermined length of time, and an index of the extent to which the periodic temperature change of working medium 12 in second path 42 is transmitted. In other words, thermal penetration depth δ means the length of the range in which heat is transferred during one cycle of upward and downward movement of movable member 2 of generator 1.

Specifically, thermal penetration depth δ is determined by the temperature conductivity α (m/s) and the angular frequency ω (rad/s) as expressed by Equation (2) below.

$$\delta=\sqrt{(2\alpha/\omega)} \quad (2)$$

where temperature conductivity α, which is determined by heat conductivity λ, density ρ and specific heat Cp of the material, i.e. by the type of the material, is expressed by Equation (3) below. Angular velocity ω is determined by frequency f and period T. These factors are related to each other as expressed by Equations (4) and (5) below.

$$\alpha=\lambda/(\rho\cdot Cp) \quad (3)$$

$$\omega=2\pi f \quad (4)$$

$$f=1/T \quad (5)$$

As understood from Equations (2) to (5), the thermal penetration depth δ is calculated based on the type of the material and the period of generator 1.

Thermal penetration depth δ can be determined also by the ordinary method of heat conduction analysis.

Also in upper part 51, like in parallelopipedal portion 53 of lower part 52, the thickness of inner member 51*a* is equal to thermal penetration depth δ thereof, and the thickness of outer member 51*b* satisfies the strength required to form a pressure vessel.

Next, a method of fabricating the heating unit will be explained.

First, upper part 51 and lower part 52 are fabricated by bonding inner members 51*a*, 53*a* and outer members 51*b*, 53*b*, respectively. Any of various bonding methods such as the diffusion bonding, the roll bonding, brazing and friction bonding can be employed. The bonding process is performed so that the contact heat resistance at the joint between inner members 51*a*, 53*a* and outer members 51*b*, 53*b* is lower than the thermal resistance of outer members 51*b*, 53*b*.

Upper part 51 and lower part 52 are fitted with each other in such a manner as to support upper part 51 on each step 55 of lower part 52, and by thus bonding them to each other, heating unit 13 is fabricated. In the process, any of various bonding methods such as diffusion bonding, roll bonding, brazing, friction bonding and welding can be employed.

Then, first and second covers 27, 28 and fins 29, 30 are attached to the outside of heating unit 13 fabricated in the above-described way, and third tubular portion 11*c* is inserted into and bonded with the opening of lower part 52 thereby to fabricate external combustion engine 10.

Next, the operation with the constitution described above will be explained.

As shown in FIG. 1, the exhaust gas of the internal combustion engine not shown is supplied into first and second covers 27, 28 on the outside of heating unit 13, so that heating unit 13 is heated by heat exchange with the exhaust gas.

Cooling unit 14, on the other hand, is cooled by the cooling water circulating in the cooling water circuit not shown.

As described above, during the operation of the power generating system, the heating unit is kept heated and the cooling unit kept cooled.

Once working medium 12 in first and second paths 41, 42 is vaporized by being heated in heating unit 13, the high-temperature high-pressure vapor of working medium 12 is accumulated in second path 42, first path 41 and third tubular portion 11*c* in that order from the inside of vapor pool 43. This vapor pushes down the liquid level of working medium 12 in third tubular portion 11*c*. Then, the liquid portion of working medium 12 is displaced toward first tubular portion 11*a* and pushes up piston 3 of generator 1.

Next, the liquid level of working medium 12 in third tubular portion 11*c* drops to cooling unit 14, and the vapor of working medium 12 enters cooling unit 14. Then, the vapor of working medium 12 is cooled and liquefied by cooling unit 14. As a result, the force to push down the liquid level of working medium 12 is lost, and the liquid level of working medium 12 rises while at the same time raising the liquid portion of working medium 12. As a result, piston 3 of generator 1 pushed up by the expansion of the vapor of working medium 12 moves down.

By repeating this operation, the liquid portion of working medium 12 in container 11 is periodically displaced by what is called the self-excited vibration, with the result that movable member 2 of generator 1 is moved up and down periodically.

Next, the main features of this embodiment will be explained.

According to this embodiment, as described above, heating unit 13 is so structured that inner members 51*a*, 53*a* arranged inside and outer members 51*b*, 53*b* arranged outside are bonded to each other, and outer members 51*b*, 53*b* are made of the second material higher in heat resistance than the first material making up inner members 51*a*, 53*a*. Therefore, the heating temperature can be higher than in the prior art. The heating operation can be performed, for example, at the temperature of about 600 to 800° C.

Unlike this embodiment, the heating unit is made of only the first material high in heat transmission performance and heated at a higher temperature than in the prior art. Even in such a case, the heating unit having a structure that can withstand the higher temperature can be fabricated by increasing the thickness of the members making up the heating unit if the temperature is lower than the softening point of the material. However, compared with such a constitution, this embodiment is advantageous in that the members of heating unit 13 can be reduced in thickness, and therefore, the size of heating unit 13 can also be reduced.

Further, according to this embodiment, the thickness of inner members 53*a*, 51*a* equal to thermal penetration depth δ thereof is secured. As compared with the constitution in which the heating unit is made of only the second material high in heat resistance unlike in this embodiment, the temperature decrease of heating unit 13 after heat exchange between the liquid portion of working medium 12 and heating unit 13 in the boiling process for generating the vapor of working medium 12 can be minimized as described below for an improved engine efficiency.

Figure 5:
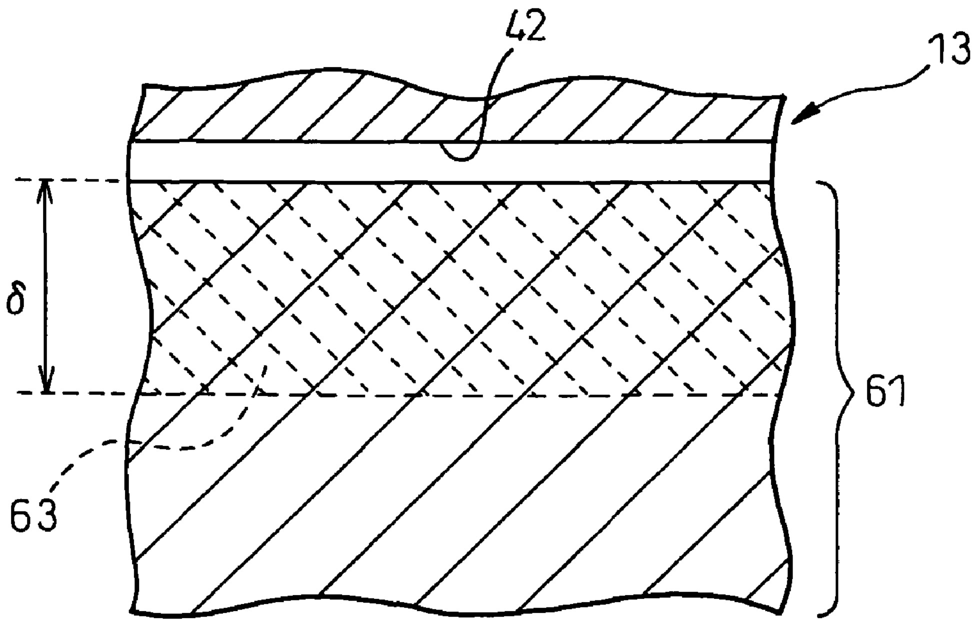
FIG. 5 is a partially enlarged view of the heating unit according to a comparative example of the first embodiment.
Figure 6:
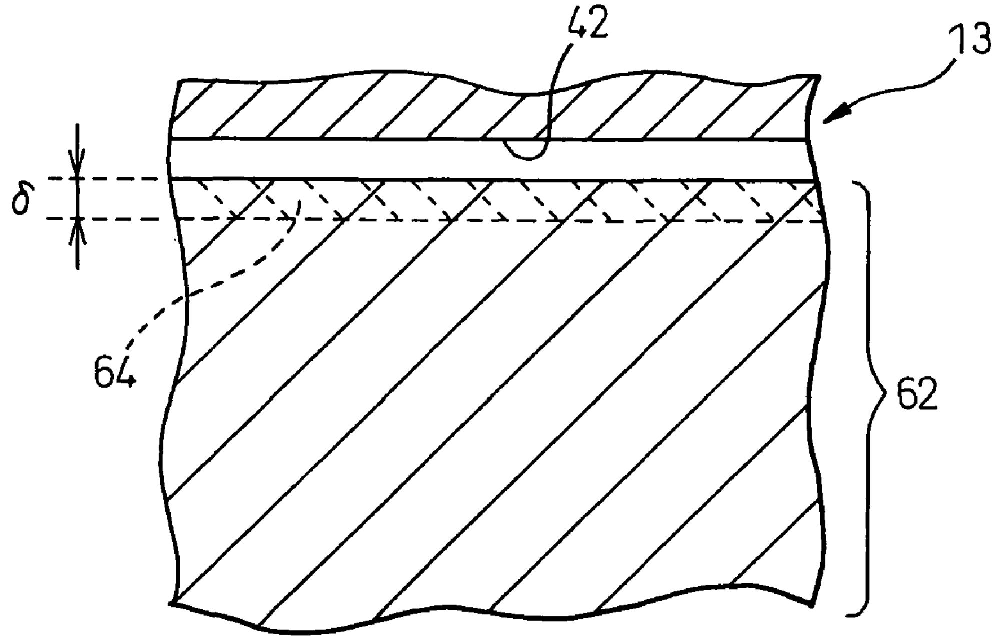
FIG. 6 is a partially enlarged view of the heating unit according to a comparative example of the first embodiment.

FIGS. 5 and 6 show partial enlarged views comparable to FIG. 4, as comparative examples of this embodiment, of a constitution in which heating unit 13 is formed of only a first member 61 of the first material and a constitution in which heating unit 13 is formed of only second member 62 of the second material.

Figure 13:
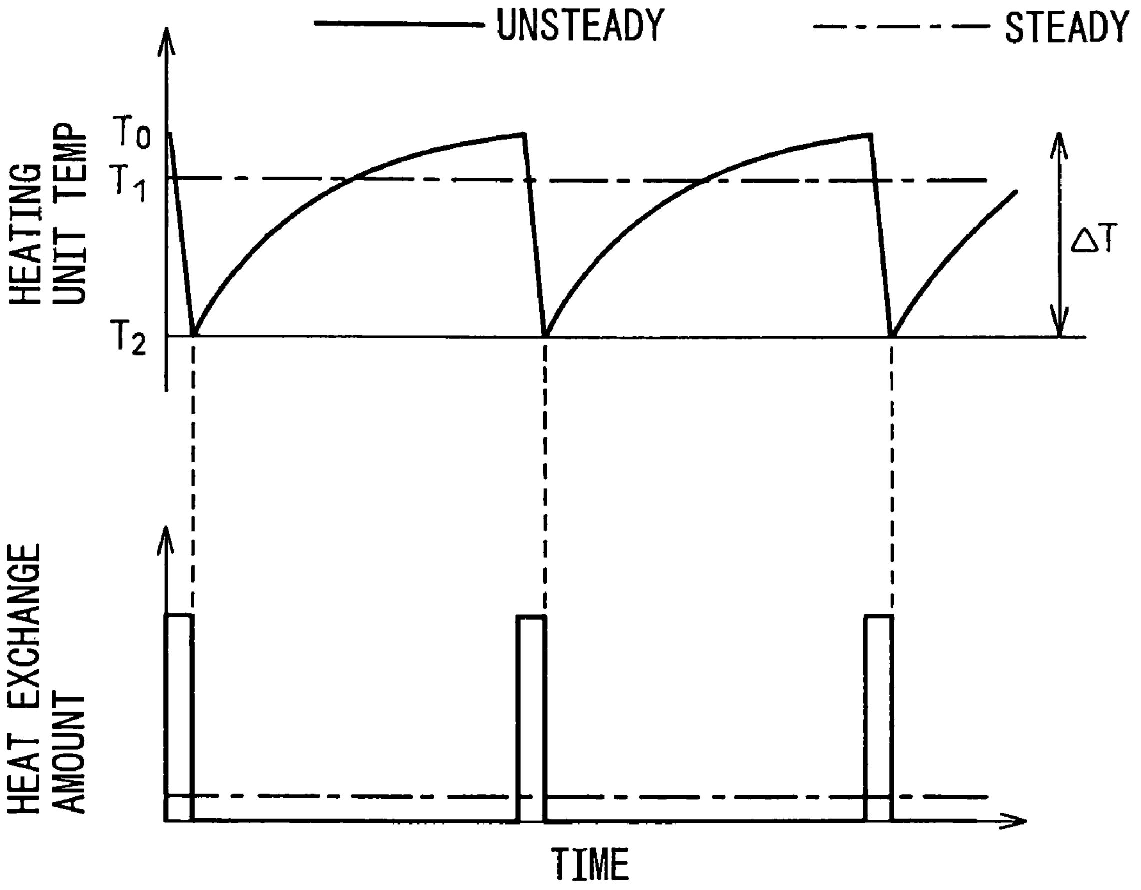
FIG. 13 is a diagram showing the change in the heat exchange amount and the heating unit temperature with time in the case where the heating unit is made of a material high in heat conductivity.

First, also in this embodiment, the heat transmission phenomenon unique to the external combustion in which the temperature of the heating unit drops after heat exchange as explained, with reference to FIG. 13, in the column describing the problem to be solved by the invention occurs for the reason described below.

Specifically, during the operation of external combustion engine 10, heating unit 10 has a predetermined amount of heat supplied with an external source and further supplied with heat from the external source. However, in order to generate the vapor by heating working medium 12, the amount of heat larger than that supplied from the external source is required. Therefore, heating unit 13 is deprived of heat by the working medium and the heat from the external source becomes in short supply. Therefore, in the boiling process, heating unit 13 is deprived of the heat in the amount required for generating the vapor of working medium 12, so that the temperature of heating unit 13 drops after heat exchange.

In the process, as shown in FIGS. 5 and 6, areas 63, 64 of a predetermined depth from the surface facing working medium 12, i.e. the surface of heating unit 13 making up second path 42, are deprived of the amount of heat required for generation of the vapor. This predetermined depth is equal to the thermal penetration depth δ.

The thermal penetration depth δ is smaller for second member 62 made of the second material high in heat resistance shown in FIG. 6 than for first member 61 made of the first material high in heat transmission performance shown in FIG. 5. Therefore, area 64 of second member 62 deprived of the amount of heat required for generation of the vapor is smaller than area 63 of first member 61 deprived of the amount of heat required for generation of the vapor. Also, in the case where the same amount of heat is deprived of, the smaller the range in which heat is deprived of, the larger the amount of heat deprived of per unit area.

Figure 14:
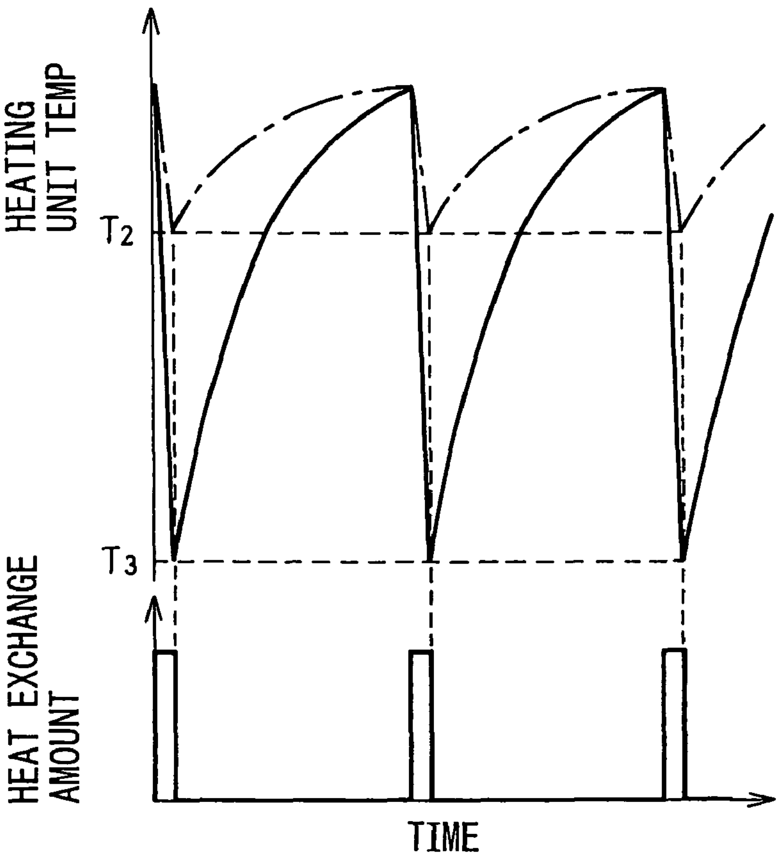
FIG. 14 is a diagram showing the change in the heat exchange amount and the heating unit temperature with time in the case where the heating unit is made of only a material high in heat conductivity and the case where it is made of only a material high in heat resistance.
Figure 15:
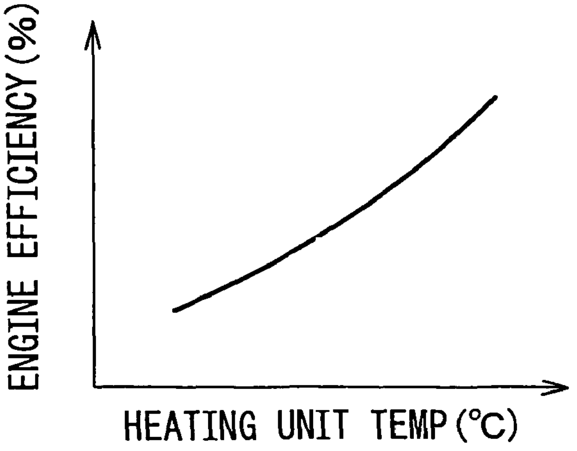
FIG. 15 is a diagram showing the relationship between engine efficiency and the temperature of the portion of the heating unit in contact with the medium.

As shown in FIG. 14, the temperature decrease at the portion of the heating unit in contact with the working medium after heat exchange is larger in the case where the heating unit is made of only a material high in heat resistance than in the case where the heating unit is made of a material high in heat transmission performance.

In view of this, according to this embodiment, inner members 51*a*, 53*a* of heating unit 13 are made of the first material higher in heat transmission performance and larger in thermal penetration depth δ than the second material high in heat resistance, and the thickness of inner members 51*a*, 53*a* is rendered equal to the value corresponding to thermal penetration depth δ of the first material. Therefore, in the heat exchange between the liquid portion of working medium 12 and heating unit 13 in the boiling process, the heat in the amount required for vapor generation can be transferred to working medium 12 from the entire range of inner members 53*a*, 51*a*. Thus, compared with the case in which heating unit 13 is made of only the second material, the heat in the amount required for vapor generation can be transferred to working medium 12 from a wider range of the members.

According to this embodiment, the temperature drop at the portion of the heating unit in contact with the working medium after heat exchange can be reduced more than with the constitution in which the heating unit is made of only the second material high in heat resistance. Thus, the temperature decrease can be minimized.

Figure 7:
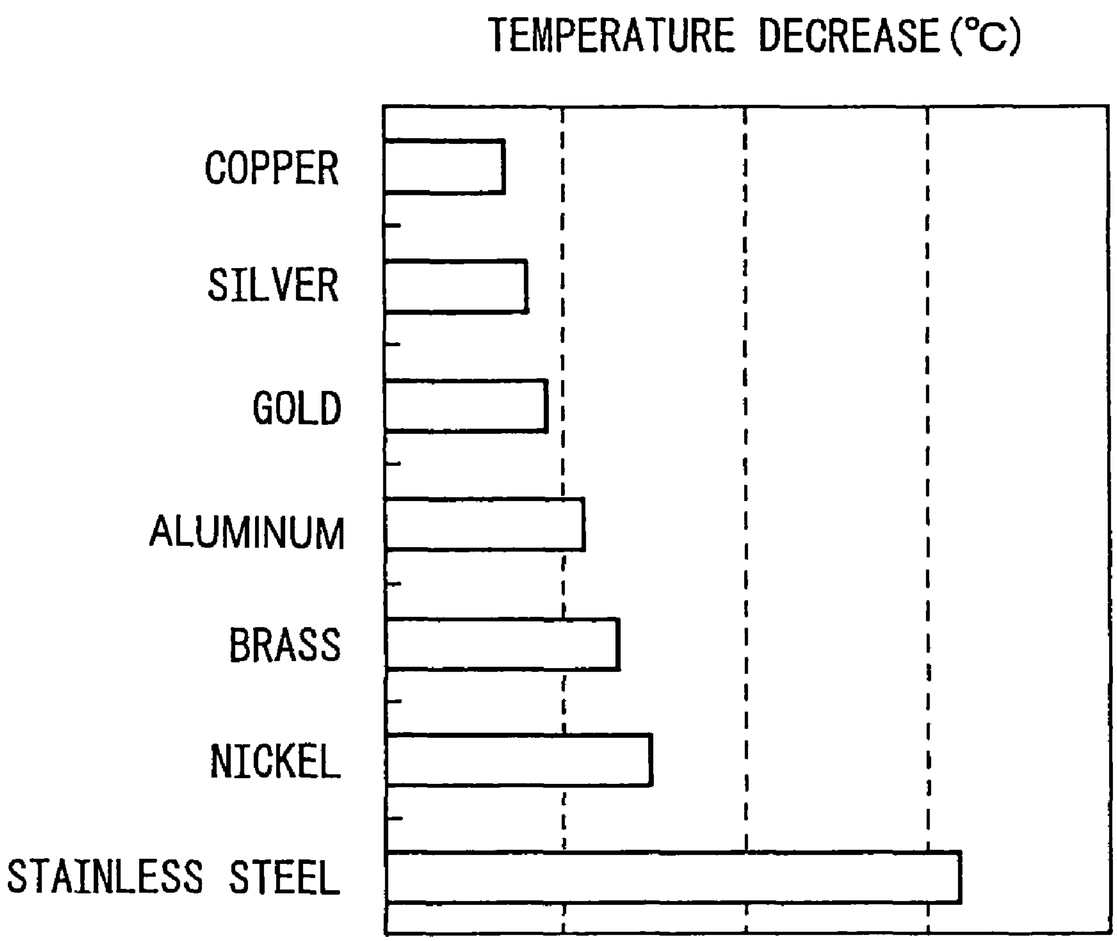
FIG. 7 shows the result of the heat transmission analysis for the temperature decrease after heat exchange with the component members of the heating unit using various materials.

Next, the temperature decrease of the heating unit after heat exchange in the boiling process for different materials will be explained. FIG. 7 shows the result of heat transmission analysis of the temperature decrease after heat exchange for various materials of the component members of the heating unit. The result shown in FIG. 7 is obtained under the same conditions. As shown in FIG. 7, the temperature decrease is smallest for copper, followed by silver, gold, aluminum, brass, nickel and stainless steel in that order. Therefore, among these metals, copper is the best choice as the first material.

Also, comparison of the heat resistance of various materials shows that the strength at the high temperature of, for example, about 600 to 800° C. is high for aluminum, silver, gold, brass, copper, stainless steel and nickel in ascending order. Therefore, among these metals, stainless steel or nickel is preferably used as the second material.

Also, according to this embodiment, the thickness of inner members 53*a*, 51*a* is set to the same level as the thermal penetration depth δ of inner members 51*a*, 53*a*. Specifically, the thickness of inner members 53*a*, 51 is set to the required minimum for transferring heat in the amount required for vapor generation from a wide range of the members to working medium 12. Thus, the thickness of heating unit 13 can be reduced to the required minimum. Therefore, according to this embodiment, heating unit 13 can be reduced in size. The wording "the same level" herein is not necessarily intended to mean "completely identical", but includes a case involving a tolerable variation for manufacture.

According to this embodiment, for example, inner members 51*a*, 53*a* of heating unit 13 are made of the first material such as copper, and outer members 51*b*, 53*b* of the second material such as stainless steel. As compared with the case where heating unit 13 is made of only the first material such as copper, the thickness of heating unit 13 can be reduced to about between one fourth and one tenth.

Second Embodiment

Figure 8:
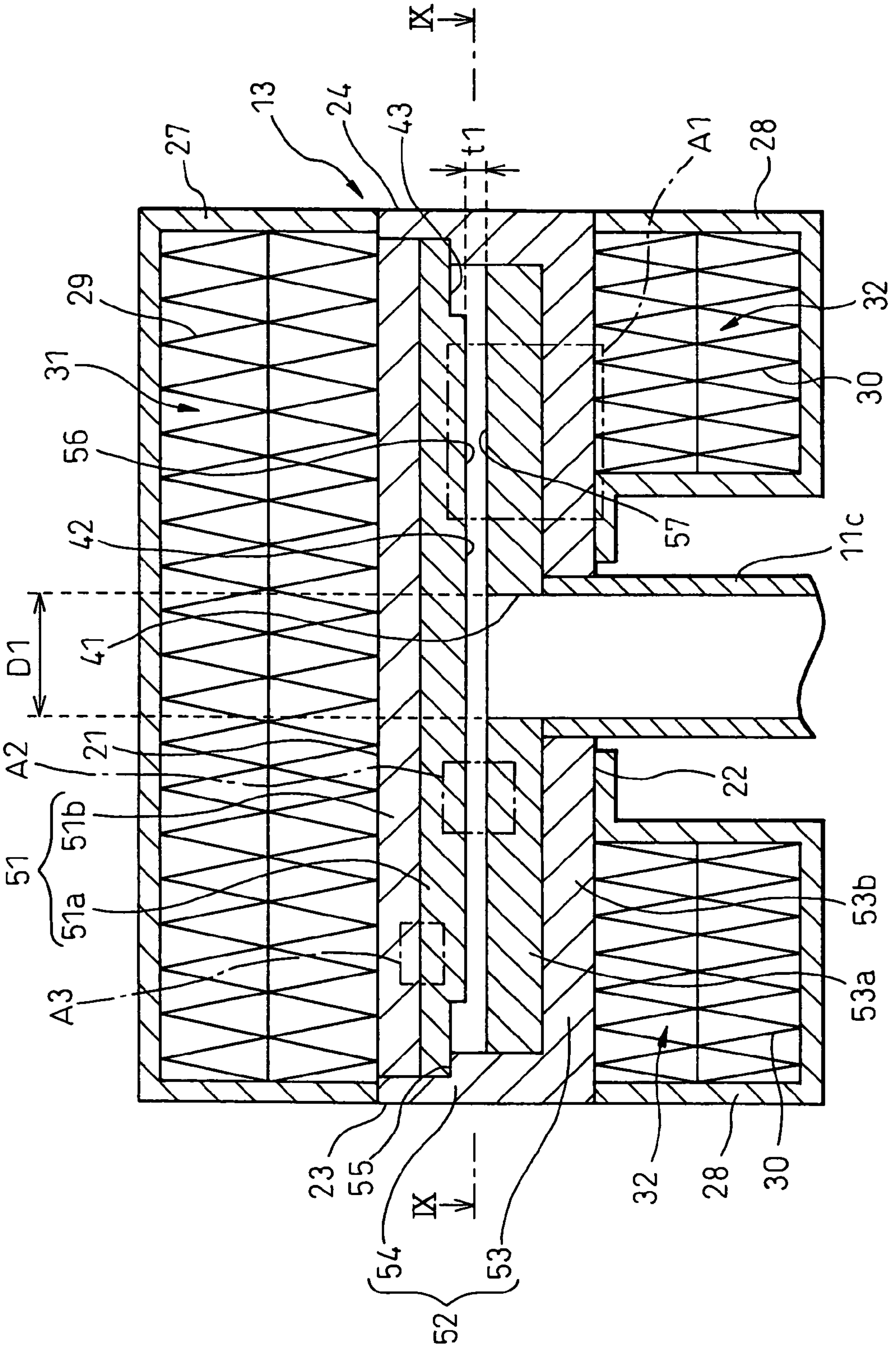
FIG. 8 is a longitudinal sectional view of heating unit 13 according to a second embodiment of the invention.
Figure 9:
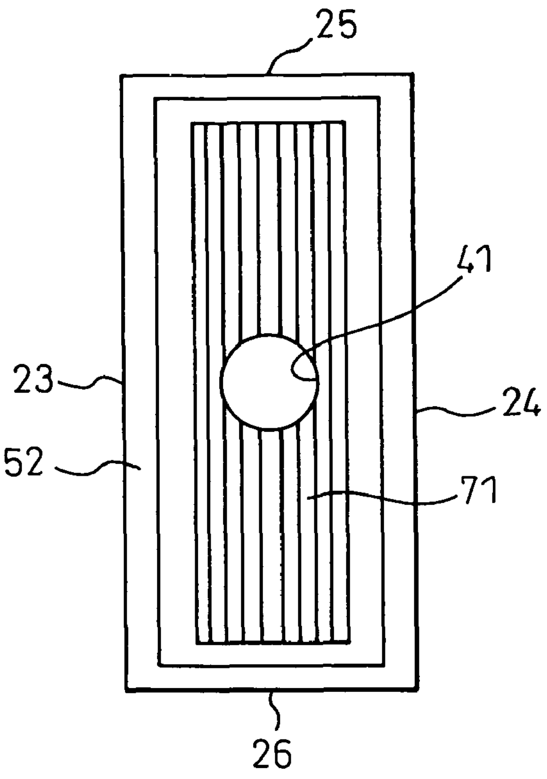
FIG. 9 is a sectional view taken along line IX-IX in FIG. 8.
Figure 10:
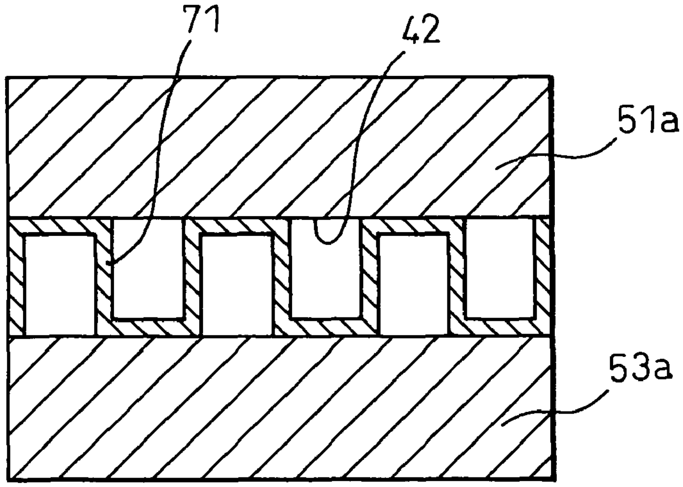
FIG. 10 is an enlarged view of an area A2 in FIG. 8.

FIG. 8 is a longitudinal sectional view of heating unit 13, FIG. 9 a sectional view taken along line IX-IX in FIG. 8, and FIG. 10 an enlarged view of area A2 in FIG. 8. In FIG. 8, heating unit 13 corresponds to heating unit 13 according to the first embodiment explained with reference to FIG. 2, and the component parts similar to those in FIG. 2 are designated by the same reference numerals, respectively. The points of this embodiment are different from the first embodiment and will be explained below.

As shown in FIGS. 9, 10, according to this embodiment, inner fins 71 are arranged in contact with inner members 51*a*, 53*a* in heating unit 13, i.e. in second path 42.

Inner fins 71, as shown in FIG. 10, have a corrugated section and are configured of the same material as inner members 51*a*, 53*a* such as copper or aluminum.

In this way, according to this embodiment, compared with the case in which inner fins 71 are not arranged within the internal space of heating unit 13, heating unit 13 is reinforced and the strength against the inner pressure of heating unit 13 can be improved with inner fins 71.

As described above, according to this embodiment, compared with the first embodiment in which inner fins 71 are not used, the thickness of outer members 51*b*, 53*b* can be reduced while at the same time holding the strength required of a pressure vessel.

Third Embodiment

Figure 11:
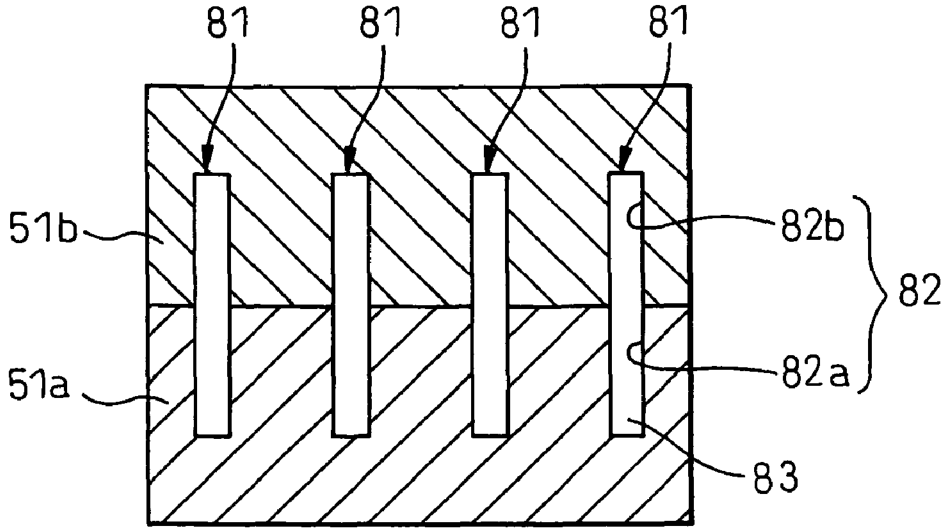
FIG. 11 is an enlarged view of an area A3 in FIG. 8.

FIG. 11 is an enlarged view of area A3 in FIG. 8. The points of this embodiment different from the first and second embodiments will be explained below.

According to this embodiment, as shown in FIG. 11, heating unit 13 includes a plurality of heat pipes 81 at positions which are different from the internal portion where working medium 12 flows in and which are in contact with inner member 51*a* made of the first material.

Heat pipes 81 each comprise a pipe 82 making up a closed space and a heat medium 83 which is sealed in pipe 82 and capable of changing phase. In FIG. 11, pipes 82 are arranged in the neighborhood of the junction between inner member 51*a* and outer member 51*b* of upper part 51. Inner member 51*a* and outer member 51*b* are bonded to each other in such a manner that grooves 82*a* formed on inner member 51*a* and grooves 82*b* formed on outer member 51*b* are in opposed relation to each other thereby to form pipes 82. Pipes 82 are arranged in parallel to the direction of thickness of upper part 51.

Heat medium 83 is, for example, water. Heat pipes 81 are for heating working medium 12 in the boiling process taking advantage of the latent heat for water evaporation and intended to supplement inner members 51*a*, 53*a* with the amount of heat required for boiling working medium 12.

Heat pipes 81 are formed on one or both of upper part 51 and lower part 52.

The method of fabricating heating unit 13 according to this embodiment may be changed from the fabrication method according to the first embodiment in the manner described below. Specifically, grooves 82*a*, 82*b* for heat pipes 81 are formed beforehand on the inner and outer members, and at the time of bonding the inner and outer members to each other, water is filled in grooves 82*a*, 82*b*. Then, by placing grooves 82*a* and 82*b* in opposed relation to each other, inner member 51*a* and outer member 51*b* are bonded to each other.

According to this embodiment, heat pipes 81 are arranged at positions in contact with inner member 51*a* of heating unit 13, and therefore the heat transmission performance of inner member 51*a* can be apparently improved.

In the case where an attempt is made to produce similar effects to the first embodiment for suppressing the temperature decrease of heating unit 13 after heat exchange, the thickness of inner member 51*a* can be reduced for a smaller size of heating unit 13 as compared with heating unit 13 according to the first embodiment lacking heat pipes 81.

Heat pipes 81, though arranged in the neighborhood of the joint between inner member 51*a* and outer member 51*b* of upper part 51 in FIG. 11, may alternatively be arranged at any other position in contact with inner member 51*a* to supplement the inner member with the amount of heat required for boiling working medium 12 by heat pipes 81.

Other Embodiments (1) The thickness of inner members 51*a*, 53*a*, though equal to thermal penetration depth δ of the first material according to first to third embodiments, is not necessarily equal to thermal penetration depth δ of the first material. For the purpose of minimizing the temperature decrease of the heating unit after heat exchange in the boiling process, the thickness of inner members 51*a*, 53*a* is increased beyond thermal penetration depth δ, and for the purpose of reducing the temperature decrease of the heating unit after heat exchange as compared with the case in which only the second material is used, the thickness of inner members 51*a*, 53*a* is set to at least 50% of thermal penetration depth δ. Incidentally, the upper limit value of thickness is about the size in which the power generating system according to this embodiment can be made available as a product.

(2) According to the first to third embodiments, heating unit 13 is structured so that inner members 51*a*, 53*a* made of the first material are directly bonded to outer members 51*b*, 53*b* made of the second material, and outer members 51*b*, 53*b* are arranged at the outermost position of heating unit 13. However, as long as inner members 51*a*, 53*a* made of the first material are arranged inside and outer members 51*b*, 53*b* made of the second material outside, still another member may be arranged on the outside of outer members 51*b*, 53*b* or an intermediate member may be interposed between inner members 51*a*, 53*a* and outer members 51*b*, 53*b*.

(3) According to the first to third embodiments, heating unit 13 is structured so that inner members 51*a*, 53*a* made of the first material and outer members 51*b*, 53*b* made of the second material are bonded to each other. As an alternative, heating unit 13 may be configured of a single member that can be made of the component materials in variable ratios.

Specifically, the heating unit may comprise a single member having one surface of a first material and the other surface of a second material, wherein the portion between one and the other surface is made of the first and second materials in different ratios. In such a case, the inner portion of heating unit 13 facing working medium 12 is made of a first material higher in heat transmission performance β than the outer portion on the outside of the inner portion, while the outer portion is made of a second material high in the upper limit temperature at which the strength required of the container during the operation of the external combustion engine can be maintained.

(4) In each embodiment described above, heating unit 13 is shaped so as to include first path 41 extending in the same direction as third tubular portion 11*c* and second path 42 extending radially outward of first path 41. Nevertheless, this invention is also applicable to other shapes of heating unit 13 with equal effect.

Figure 12:
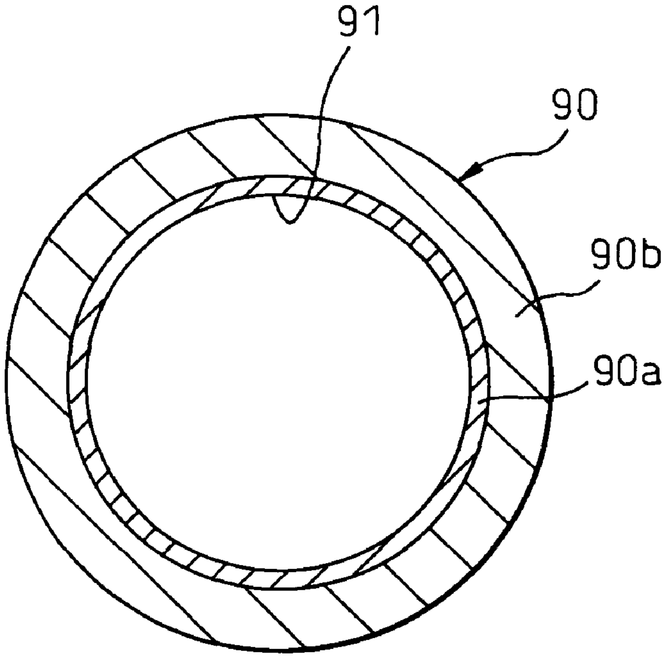
FIG. 12 is a cross sectional view of the heating unit according to another embodiment of the invention.

A cross sectional view of a heating unit 90 according to another embodiment is shown in FIG. 12. Heating unit 90 shown in FIG. 12 corresponds to heating unit 13 shown in FIG. 2. In the case where heating unit 90 is formed in the shape of a cylinder with a circular cross section having only a path 91 therein extending in the same direction as third tubular portion 11*c* as shown in FIG. 12, for example, an inner member 90*a* facing working medium 12 can be made of a first material and an outer member 90*b* located outside inner member 90*a* of a second material.

Also by doing so, a similar effect to the first embodiment can be produced. Incidentally, the shape of the first embodiment is more desirable than that of the embodiment shown in FIG. 12 in view of the fact that according to the shape of the first embodiment, working medium 12 impinges on surface 56 forming second path 42 and is agitated to generate a turbulent flow when the liquid portion of working medium 12 flows from first path 41 to second path 42, thereby improving the heat transfer rate from heating unit 13 to working medium 12.

(5) In each embodiment described above, the heat of the exhaust gas of the internal combustion engine is used as an external heat source. Alternatively, other heat sources such as an electric heater may be used. This invention is effectively applicable to the case in which the heating unit is heated at a higher temperature than in the prior art.

(6) Any of the embodiments described above may be combined freely as much as possible.

While the invention has been described by reference to specific embodiments chosen for purposes of illustration, it should be apparent that numerous modifications could be made thereto by those skilled in the art without departing from the basic concept and scope of the invention.

The invention claimed is:

1. An external combustion engine comprising a container sealed with a working medium adapted to flow in a liquid state;

wherein the container includes a heating unit for heating part of the working medium and generating a vapor of the working medium and a cooling unit for cooling and liquefying the vapor;

wherein the generation and liquefaction of the vapor by the heating unit and the cooling unit changes the volume of the working medium and a displacement of the liquid portion of the working medium caused by the volume change of the working medium is converted into mechanical energy and output;

wherein the heating unit is heated by a heat source external to the heating unit and generates the vapor by exchanging heat with the working medium in the liquid state flowing into the heating unit;

wherein the heating unit is formed by bonding inner members arranged on the inside facing the working medium and outside members arranged on the outside facing the heat source;

wherein the inner members of the heating unit facing the working medium are made of a first material higher in heat transmission performance than said outer members, and the outer members are made of a second material higher than the inner members in an upper limit temperature at which a required strength of the container can be maintained during the operation of the external combustion engine.

2. The external combustion engine according to claim 1:

wherein a thickness of the inner members in a direction perpendicular to a surface in contact with the working medium is not smaller than a thermal penetration depth of the first material.

3. The external combustion engine according to claim 1:

wherein a thickness of the inner members in a direction perpendicular to a surface in contact with the working medium is equal to a thermal penetration depth of the first material.

4. The external combustion engine according to claim 1:

wherein a thickness of the inner in a direction perpendicular to a surface in contact with the working medium is not smaller than 50% of a thermal penetration depth of the first material.

5. The external combustion engine according to claim 1:

wherein the heating unit includes inner fins arranged within an internal portion of the heating unit into which the working medium flows thereby to reinforce the heating unit.

6. An external combustion engine comprising a container sealed with a working medium adapted to flow in a liquid state;

wherein the container includes a heating unit for heating part of the working medium and generating a vapor of the working medium and a cooling unit for cooling and liquefying the vapor;

wherein the generation and liquefaction of the vapor by the heating unit and the cooling unit changes the volume of the working medium and the displacement of the liquid portion of the working medium caused by the volume change of the working medium is converted into mechanical energy and output;

wherein the heating unit is heated by a heat source external to the heating unit and generates the vapor by exchanging heat with the working medium in the liquid state flowing into the heating unit;

wherein inner members of the heating unit facing the working medium are made of a first material higher in heat transmission performance than outer members located on the outside of the inner members, and the outer members are made of a second material higher than the inner members in an upper limit temperature at which a required strength of the container can be maintained during the operation of the external combustion engine; and wherein the heating unit comprises a plurality of heat pipes each including a pipe forming a closed space at a position which is different from the internal portion into which the working medium flows and which is in contact with the inner portions made of the first material, and a thermal medium sealed in the pipes and capable of changing phase.

7. The external combustion engine according to claim 1:

wherein the first material is selected one of elementary metals including copper, silver, gold and aluminum or a metal material containing any of the elementary metals, and wherein the second material is selected one of austenitic stainless steel, nickel and nickel alloy.

8. An external combustion engine comprising:

a container sealed with a working medium adapted to flow in a liquid state, and comprising a first substantially vertically extending tubular portion, a second substantially horizontally extending tubular portion and a third substantially vertically extending tubular portion;

a heating unit having an upper part and a lower part, for heating part of the working medium and generating a vapor of the working medium, the heating unit having a contour in the shape of a parallelepiped extending in a direction perpendicular to the third tubular portion of the container, and having an upper surface, a lower surface and side surfaces, the heating unit being connected to an upper end of the third tubular portion so as to introduce the working medium into a space disposed between said upper part and said lower part;

a cooling unit for cooling and liquefying the vapor, the cooling unit being arranged on a portion of the third tubular portion lower than the heating unit;

an upper heating fluid passage through which a heating fluid as a heat source flows, the upper heating fluid passage being formed such that the heating fluid is in contact with the upper surface of the heating unit; and a lower heating fluid passage through which the heating fluid flows, the lower heating fluid passage being formed such that the heating fluid is in contact with the lower surface of the heating unit, wherein the generation and liquefaction of the vapor by the heating unit and the cooling unit changes the volume of the working medium and a displacement of the liquid portion of the working medium caused by the volume change of the working medium is converted into mechanical energy and output;

wherein the heating unit is heated by the heating fluid and generates the vapor by exchanging heat with the working medium in the liquid state flowing into the space;

wherein the upper part of the heating unit comprises a first inner member located on the inside of the heating unit and a first outer member located on the outside of the first inner member which are directly bonded to each other, and the lower part of the heating unit comprises a second inner member located on the inside of the heating unit and a second outer member located on the outside of the second inner member which are directly bonded to each other;

wherein the space comprises a first path substantially vertically extending through the second outer member and communicating with the third tubular portion, a second path substantially horizontally extending between the first and second inner members and communicating with the first path, and a vapor pool providing a space for storing the vapor of the working medium generated in the heating unit and arranged along the outer periphery of the heating unit; and wherein the first and second inner members of the heating unit facing the working medium are made of a first material higher in heat transmission performance than the first and second outer members, and the first and second outer members are made of a second material higher than the first and second inner members in an upper limit temperature at which a required strength of the container can be maintained during the operation of the external combustion engine.

9. The external combustion engine according to claim 1, wherein the inner members are in direct contact with the working medium and the outer members are in direct contact with a heat source provided to the heating unit.

10. The external combustion engine according to claim 9, wherein the outer members are not in contact with the working medium.

11. The external combustion engine according to claim 1, wherein the outer members are not in contact with the working medium.

12. The external combustion engine according to claim 1, wherein an inner surface of each outer member is in direct contact with an outer surface of a respective inner member.

* * * * *

UNITED STATES PATENT AND TRADEMARK OFFICE

CERTIFICATE OF CORRECTION

PATENT NO. : 7,779,632 B2
APPLICATION NO. : 12/074595
DATED : August 24, 2010
INVENTOR(S) : Yasunori Niiyama et al.

It is certified that error appears in the above-identified patent and that said Letters Patent is hereby corrected as shown below:

Col. 14, line 2, claim 4, after "inner" insert --members--

Signed and Sealed this

Ninth Day of November, 2010

David J. Kappos

David J. Kappos
*Director of the United States Patent and Trademark Office*